(12) United States Patent
Duenne et al.

(10) Patent No.: US 10,478,037 B2
(45) Date of Patent: Nov. 19, 2019

(54) METHOD FOR OPERATING A FLOOR-CLEANING DEVICE AND FLOOR-CLEANING DEVICE

(71) Applicants: Alfred Kärcher GmbH & Co. KG, Winnenden (DE); robart GmbH, Linz (AT)

(72) Inventors: Markus Duenne, Vreden (DE); Michael Schahpar, Linz (AT); Harold Artes, Ottensheim (AT)

(73) Assignee: robart GmbH, Linz (AT)

( * ) Notice: Subject to any disclaimer, the term of this patent is extended or adjusted under 35 U.S.C. 154(b) by 5 days.

(21) Appl. No.: 15/014,778

(22) Filed: Feb. 3, 2016

(65) Prior Publication Data
US 2016/0150933 A1    Jun. 2, 2016

Related U.S. Application Data

(63) Continuation of application No. PCT/EP2013/066463, filed on Aug. 6, 2013.

(51) Int. Cl.
*A47L 9/28* (2006.01)
*G05D 1/02* (2006.01)

(52) U.S. Cl.
CPC ........... *A47L 9/2894* (2013.01); *A47L 9/2805* (2013.01); *G05D 1/0274* (2013.01); *A47L 2201/06* (2013.01); *G05D 2201/0203* (2013.01)

(58) Field of Classification Search
CPC .. A47L 9/2894; A47L 9/2805; A47L 2201/06; G05D 1/0274; G05D 2201/0203
See application file for complete search history.

(56) References Cited

U.S. PATENT DOCUMENTS

| 6,667,592 B2 | 12/2003 | Jacobs et al. |
| 6,885,912 B2 * | 4/2005 | Peless .................. G05D 1/0219 180/167 |

(Continued)

FOREIGN PATENT DOCUMENTS

| CN | 102541059 | 7/2012 |
| EP | 2 294 960 | 3/2011 |

(Continued)

OTHER PUBLICATIONS

Machine translation—KR100730311; Jeon et al. (Year: 2007).*

(Continued)

*Primary Examiner* — Mikhail Kornakov
*Assistant Examiner* — Natasha N Campbell
(74) *Attorney, Agent, or Firm* — Womble Bond Dickinson (US) LLP

(57) ABSTRACT

A method for operating a self-propelling and self-steering floor-cleaning device is provided, wherein at least one map of at least one room to be cleaned is storable in a storage unit of the floor-cleaning device, as is a user-predeterminable cleaning plan having one or more cleaning tasks, wherein at least one cleaning task is associated with a particular room that is identifiable from a map, and the floor-cleaning device is placed in a room. In order to provide a method of this kind that enables efficient execution of the cleaning plan, when the cleaning plan is executed, the floor-cleaning device determines whether the room in which it is placed is the particular room, and, if the result of this determination is negative, performance of the cleaning task is not carried out, is interrupted, or is ended. A floor-cleaning device for performing the method is also provided.

28 Claims, 4 Drawing Sheets

(56) References Cited

U.S. PATENT DOCUMENTS

| | | |
|---|---|---|
| 9,298,183 B2 | 3/2016 | Artes et al. |
| 2002/0153184 A1 | 10/2002 | Song et al. |
| 2005/0022273 A1 | 1/2005 | Maeki |
| 2005/0171636 A1* | 8/2005 | Tani .................... G05D 1/0276 700/245 |
| 2010/0082193 A1* | 4/2010 | Chiappetta ........... G05D 1/0225 701/24 |
| 2012/0090126 A1* | 4/2012 | Kim ....................... A47L 9/009 15/319 |
| 2012/0109376 A1* | 5/2012 | Lee ..................... G05D 1/0246 700/259 |
| 2016/0008982 A1 | 1/2016 | Artes et al. |

FOREIGN PATENT DOCUMENTS

| | | |
|---|---|---|
| JP | 2002-85305 | 3/2002 |
| JP | 2005-216021 | 8/2005 |
| JP | 2006-106816 | 4/2006 |
| KR | 10-2004-0003089 | 1/2004 |
| KR | 10-2005-0012118 | 1/2005 |
| KR | 10-0730311 | 6/2007 |
| WO | WO 2004/082899 | 9/2004 |
| WO | WO 2007/065030 | 6/2007 |
| WO | WO 2009/132317 | 10/2009 |

OTHER PUBLICATIONS

Kim, H., et al., "User-Centered approach to Path Planning of Cleaning Robots: Analyzing User's Cleaning Behavior," Human-Robot Interaction (HRI), 2007 2nd ACM/IEEE International Conference on Mar. 8-11, 2007, pp. 373-380.

* cited by examiner

METHOD FOR OPERATING A FLOOR-CLEANING DEVICE AND FLOOR-CLEANING DEVICE

CROSS-REFERENCE TO RELATED APPLICATIONS

This application is a continuation patent application of international application number PCT/EP2013/066463, filed on Aug. 6, 2013, which is incorporated herein by reference in its entirety and for all purposes.

FIELD OF THE INVENTION

The present invention relates to a method for operating a self-propelling and self-steering floor-cleaning device, wherein at least one map of at least one room to be cleaned is storable in a storage unit of the floor-cleaning device, as is a user-predeterminable cleaning plan having one or more cleaning tasks, wherein at least one cleaning task is associated with a particular room that is identifiable from a map, and the floor-cleaning device is placed in a room.

Moreover, the present invention relates to a self-propelling and self-steering floor-cleaning device, in particular for performing the method, including a travelling gear for moving the floor-cleaning device on a floor surface, a cleaning unit for cleaning the floor surface, a control unit coupled to the travelling gear and the cleaning unit, and a storage unit that is coupled to the control unit and in which at least one map of at least one room to be cleaned is storable, as is a user-predeterminable cleaning plan having one or more cleaning tasks, wherein at least one cleaning task is associated with a particular room that is identifiable from a map, and wherein the floor-cleaning device has a sensor unit that is coupled to the control unit.

BACKGROUND OF THE INVENTION

U.S. Pat. No. 6,667,592 B2 describes a floor-cleaning device for cleaning rooms autonomously. The floor-cleaning device is able to automatically generate maps of rooms in which it is located and to store them associated with the rooms. Maps may also be predetermined by a user. Cleaning tasks may be associated with the rooms or parts thereof that can be identified from the respective map. The floor-cleaning device can determine its position in a room using sensors and can perform the cleaning task associated with this room.

WO 2009/132317 A1 also describes a floor-cleaning device that can perform a predetermined cleaning task in the room in which it is placed. The type and intensity of the cleaning, or a cleaning route, for example, may be predetermined in the cleaning task, as may cleaning patterns in order to achieve cleaning that is as thorough as possible.

An object underlying the present invention is to provide a method and a floor-cleaning device of the type mentioned in the introduction that enable the cleaning plan to be executed efficiently.

SUMMARY OF THE INVENTION

In a first aspect of the invention a method for operating a self-propelling and self-steering floor-cleaning device is proposed, wherein at least one map of at least one room to be cleaned is storable in a storage unit of the floor-cleaning device, as is a user-predeterminable cleaning plan having one or more cleaning tasks, wherein at least one cleaning task is associated with a particular room that is identifiable from a map, and the floor-cleaning device is placed in a room. When the cleaning plan is executed the floor-cleaning device determines whether the room in which it is placed is the particular room, and, if the result of this determination is negative, performance of the cleaning task is not carried out, is interrupted or is ended.

In a second aspect of the invention, a self-propelling and self-steering floor-cleaning device, in particular for performing the method, includes a travelling gear for moving the floor-cleaning device on a floor surface, a cleaning unit for cleaning the floor surface, a control unit coupled to the travelling gear and the cleaning unit, and a storage unit that is coupled to the control unit and in which at least one map of at least one room to be cleaned is storable, as is a user-predeterminable cleaning plan having one or more cleaning tasks, wherein at least one cleaning task is associated with a particular room that is identifiable from a map, and wherein the floor-cleaning device has a sensor unit that is coupled to the control unit. Using at least one signal of the sensor unit, when the cleaning plan is executed it is determinable by the control unit whether the room in which the floor-cleaning device is placed is the particular room, and, if the result of this determination is negative, performance of the cleaning task is not carried out, is interrupted or is ended.

BRIEF DESCRIPTION OF THE DRAWINGS

The foregoing summary and the following description may be better understood in conjunction with the drawing figures, of which.

DETAILED DESCRIPTION OF PREFERRED EMBODIMENTS OF THE INVENTION

Figure 1:
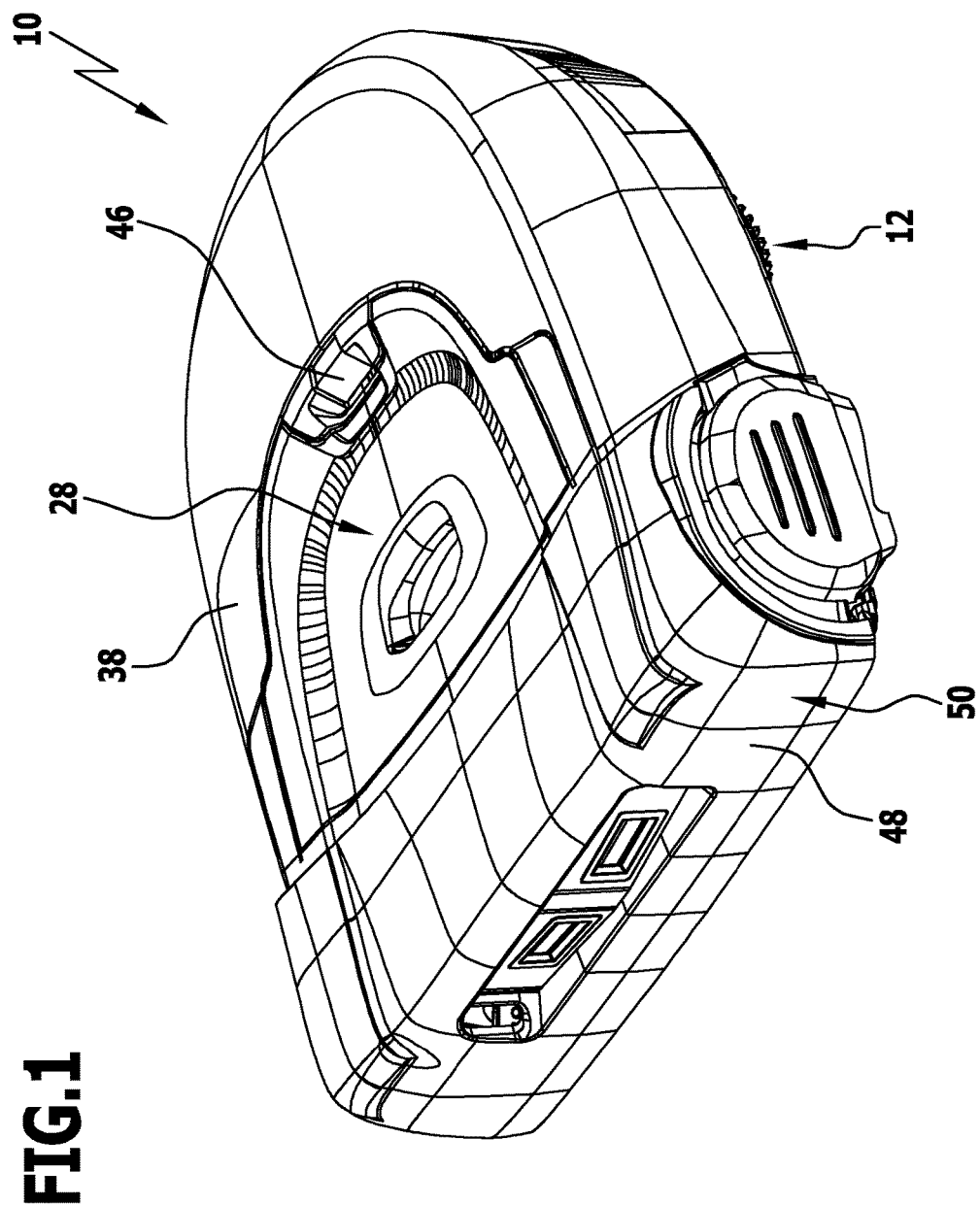
FIG. 1 shows a perspective illustration of a floor-cleaning device in accordance with the invention, in the form of a robotic sweeper/vacuum cleaner.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a method for operating a self-propelling and self-steering floor-cleaning device, wherein at least one map of at least one room to be cleaned is storable in a storage unit of the floor-cleaning device, as is a user-predeterminable cleaning plan having one or more cleaning tasks, wherein at least one cleaning task is associated with a particular room that is identifiable from a map, and the floor-cleaning device is placed in a room. When the cleaning plan is executed the floor-cleaning device determines whether the room in which it is placed is the particular room, and, if the result of this determination is negative, performance of the cleaning task is not carried out, is interrupted or is ended.

In the case of the method in accordance with the invention, it is provided for the floor-cleaning device to perform a check of whether it is located in the particular room with which a cleaning task is associated in the cleaning plan. If the floor-cleaning device determines that it is not located in the particular room but in a different room, performance of the cleaning task associated with the particular room is not carried out, is interrupted or is ended. This enables work by the floor-cleaning device that is not in accordance with the cleaning plan to be avoided, and there can be a saving on the work time of the floor-cleaning device. This allows a saving on energy that would be used to execute the inappropriate cleaning task. There is thus as little negative effect as possible on the duration of operation of the floor-cleaning device, and hence on the possibility of further execution of the cleaning plan.

The method in accordance with the invention proves particularly advantageous if the particular room with which a cleaning task is associated and the room in which the floor-cleaning device is placed are physically separated from one another such that the floor-cleaning device cannot by itself move into the particular room. This is particularly the case if the two rooms are arranged on different floors of a building or in different buildings.

It is advantageous if the floor-cleaning device determines, before the start of performing the cleaning task, whether the floor-cleaning device is located in the particular room. This allows a waste of time and energy for performing an incorrect cleaning task to be avoided. Moreover, work that may even be damaging on the room in which the floor-cleaning device is located can be avoided by this means.

Preferably, if the result of determination is negative, the floor-cleaning device sends a communication thereof to the user. For example, the floor-cleaning device may communicate to the user that it is not located in the particular room in order to perform the cleaning task, and that in particular because of physical limits it cannot move into the particular room. The user can then for example switch off the floor-cleaning device, allocate another cleaning task or cleaning plan to it, or transport the floor-cleaning device into the particular room.

It is advantageous if the floor-cleaning device makes a change to the cleaning plan if the result of determination is negative. The floor-cleaning device can automatically change the cleaning plan in order to enable it to be executed and in particular to make it as efficient as possible.

For example, the cleaning task that is associated with the particular room is deleted from the cleaning plan, or is deferred in a sequence of cleaning tasks in the cleaning plan. In the present document, "deferred" should be interpreted in particular to mean that the cleaning task is not deleted but is to be performed at a later point in the sequence of cleaning tasks to be performed. As a result of this, the floor-cleaning device can so to speak note that the cleaning task has not been performed or has not been completely performed. Accordingly, the floor-cleaning device can try to perform the cleaning task again at a later point.

It is particularly favorable if the floor-cleaning device determines whether a map of the room in which it is positioned is stored in the storage unit, and whether the cleaning plan has a cleaning task associated with this room, and if so this cleaning task is performed. The cleaning plan may thus be executed efficiently. The floor-cleaning device, as will be discussed below, may detect features of the room or objects arranged therein. The floor-cleaning device can determine whether a map that is associated with the room in which it is located is stored in the storage unit. Further, the floor-cleaning device can determine whether a cleaning task is associated with this room in the cleaning plan. Instead of the cleaning task that is not carried out, is interrupted or is ended, this other cleaning task can be performed, and execution of the cleaning plan can be continued.

Advantageously, the last-mentioned exemplary embodiment of the method is performed if the rooms are physically separated from one another and there are physical limits in the maps associated with the rooms. Because of the mutually physically separated rooms, which may in particular be located on different floors of a building, it is not possible for the floor-cleaning device to move to the particular room by itself. Instead, the room in which it is located can be processed using the further cleaning task.

In a further advantageous exemplary embodiment of the method in accordance with the invention, if the result of determination is negative it is favorable to perform cleaning of the room in which the floor-cleaning device is located, regardless of whether the cleaning plan has a cleaning task associated with this room. For example, there may be stored in the floor-cleaning device a basic cleaning routine in accordance with which any room may be cleaned in the absence of a special cleaning task. The floor-cleaning device may clean in a random manner, for example until it collides with something, in a partly planned manner or in an entirely planned manner. In the case of partly planned cleaning, the floor-cleaning device cleans for example a segment of the floor surface in a predetermined pattern and then moves to a further segment of the floor surface in order to clean this too in the same pattern. In the case of entirely planned cleaning, the floor-cleaning device may first generate a map of the room in which it is placed and, as a function of the map, generate and perform a cleaning task for cleaning the room as thoroughly and completely as possible. It may be provided, in the event of cleaning the room when the result of determination is negative, for all the cleaning tools or only some of the cleaning tools of the floor-cleaning device to be used and/or for cleaning to be carried out at a particular, predeterminable cleaning intensity.

In order to determine in which room the floor-cleaning device is located, it is preferably possible to take into consideration at least one of the following:

the position of the room in at least one spatial dimension, in particular the geographical height, longitude and/or latitude; pressure information, for example that of the air pressure, may also be regarded as height information;

the orientation of the room, for example the orientation of walls of the room in relation to the cardinal direction;

features of boundaries of the room such as walls, floor, ceiling, corners, edges, thresholds, doors, windows;

features of a floor surface of the room, in particular its nature, such as tiles, carpeting, parquet, linoleum, etc.;

features of objects arranged or included in the room, such as furnishings, power sockets, radiators, curtains, wherein in particular features of a charging and/or emptying station that is arranged in the room for the floor-cleaning device may be taken into consideration. A station for charging and/or emptying the floor-cleaning device has for example a mark or features that may be stored by the floor-cleaning device in combination with the map of the room, with the result that when the station is identified it is possible to identify the room.

Objects that are arranged in the room are preferably identified by reference to at least one mark or labeling that is detected by the floor-cleaning device. The marks or labeling may be perceptible for example optically, magnetically, acoustically, by touch or by radio. The carriers of the marks or labeling may be objects in the room that can emit signals (for example visible light, infrared, RFID, ultrasound). The objects may also reflect corresponding signals emitted by the floor-cleaning device (for example visible light, infrared, RFID, ultrasound), as a result of which it is possible to detect the objects. The objects with labeling or marks may be separate mark carriers that are arranged in the room and which are placed in the room by a user, for example marker posts, marker cubes or marker cones.

To determine in which room the floor-cleaning device is located, preferably at least a height sensor (for example a pressure sensor or GPS sensor), a position sensor (for example a GPS sensor), a compass sensor, an optical sensor (for example a laser scanner or a digital camera), a magnetic field sensor, an acoustic sensor (for example an ultrasound sensor), an electromagnetic sensor (for example an RFID transmitter and/or receiver) and/or a touch sensor are used by the floor-cleaning device. A sensor signal of the at least one sensor may be evaluated by the floor-cleaning device. Information within the sensor signal may be used to identify features of the room and objects contained therein.

The information from the sensor or sensors may also be used to generate maps of rooms, which may be stored in the storage unit in a manner associated with these rooms.

It is advantageous if the signals of two or more sensors are analyzed to find out whether the floor-cleaning device is located in the particular room, and a negative determination is only established if the analysis of the signals or the two or more sensors gives the result that this is not the case. This makes it possible to carry out a plausibility check. As a result it is possible to establish more reliably whether the floor-cleaning device is located in the particular room. Only if it can be determined with the same result from the signals of at least two sensors that this is not the case is performance of the cleaning task not carried out, interrupted or ended.

Preferably, height information is stored in combination with or as a component of a map of a room. The height information, for example a geographic height or an item of pressure information, which may in particular be linked with the air pressure, makes it possible in particular to use the method to distinguish between rooms on different floors of a building. This is possible even if rooms on different floors have the same footprint and all the other features of the rooms are also identical. By checking the height information when the cleaning plan is executed, the floor-cleaning device can determine that it is on the wrong floor, and is able not to carry out, to interrupt, or to end performance of a cleaning task.

As already mentioned, it may be provided for maps of rooms to be created by the floor-cleaning device and to be stored in the storage unit, linked to the respective rooms. In this context, all the sensors mentioned above may be used to detect the features of the room, likewise mentioned above, or objects contained therein and to store them in the map. At a later point, these features may be detected by the floor-cleaning device again. By comparing the detected and the stored features, the control unit can determine in which room the floor-cleaning device is located.

The present invention further relates to a self-propelling and self-steering floor-cleaning device, in particular for performing the method, including a travelling gear for moving the floor-cleaning device on a floor surface, a cleaning unit for cleaning the floor surface, a control unit coupled to the travelling gear and the cleaning unit, and a storage unit that is coupled to the control unit and in which at least one map of at least one room to be cleaned is storable, as is a user-predeterminable cleaning plan having one or more cleaning tasks, wherein at least one cleaning task is associated with a particular room that is identifiable from a map, and wherein the floor-cleaning device has a sensor unit that is coupled to the control unit. Using at least one signal of the sensor unit, when the cleaning plan is executed it is determinable by the control unit whether the room in which the floor-cleaning device is placed is the particular room, and, if the result of this determination is negative, performance of the cleaning task is not carried out, is interrupted or is ended.

The advantages that are already achievable in conjunction with the explanation of the method in accordance with the invention can also be achieved using the floor-cleaning device. To avoid repetition, the reader may be referred to the explanations above.

Reference can also be made to the features of advantageous embodiments of the method in accordance with the invention that can also be present or implemented in advantageous embodiments of the floor-cleaning device in accordance with the invention.

It is favorable if, before the start of performance of the cleaning task, it is determined whether the floor-cleaning device is located in the particular room so that time and energy may be saved and possibly a damaging cleaning of the room in which the floor-cleaning device is located may be avoided.

The floor-cleaning device preferably includes a communication unit that is coupled to the control unit, wherein if the result of determination is negative a communication thereof is transmissible to the user. For example, a wireless communication connection may be set up by way of the communication unit, for example by way of WLAN and the Internet, or by way of a telecommunications connection.

The communication unit may include or form an input unit by way of which the user can predetermine operating instructions. For example, cleaning plans may be input and/or maps of rooms may be transmitted to the floor-cleaning device.

If the result of determination is negative, a change in the cleaning plan is preferably made by the control unit.

Advantageously, the cleaning task is deleted from the cleaning plan or is deferred in a sequence of cleaning tasks in the cleaning plan.

It is particularly favorable if it is determinable by the control unit whether a map of the room in which the floor-cleaning device is positioned is stored in the storage unit, and whether the cleaning plan has a cleaning task associated with this room, and if so this cleaning task is performed by the floor-cleaning device. The cleaning plan may thus be executed efficiently by being implemented by the floor-cleaning device automatically. A cleaning task that is associated with the room in which the floor-cleaning device is currently located may be performed.

Advantageously, the cleaning task is performed if the rooms are physically separated from one another and there are physical limits in the maps associated with the rooms.

It is advantageous, if the result of determination is negative, if cleaning of the room in which the floor-cleaning device is located is performable by the floor-cleaning device regardless of whether the cleaning plan has a cleaning task associated with this room. For example, a basic cleaning routine is performed, as already explained above.

In order to determine in which room the floor-cleaning device is located, in particular at least one of the following is taken into consideration:

the position of the room in at least one spatial dimension, in particular the geographical height, longitude and/or latitude, including height information, for example in the form of an item of pressure information;

the orientation of the room;

features of boundaries of the room;

features of a floor surface of the room;

features of objects arranged or included in the room, in particular features of a charging and/or emptying station that is arranged in the room for the floor-cleaning device.

Objects that are arranged in the room are preferably identified by reference to at least one mark or labeling that is detectable by the floor-cleaning device by means of the sensor unit.

The sensor unit preferably includes at least a height sensor (for example a pressure sensor or GPS sensor), a position sensor (for example a GPS sensor), a compass sensor, an optical sensor (for example a laser scanner or a digital camera), a magnetic field sensor, an acoustic sensor (for example an ultrasound sensor), an electromagnetic sensor (for example an RFID transmitter and/or receiver) and/or a touch sensor. Using the at least one sensor, in particular features of the room and/or objects contained therein may be detected to generate a map of the room that includes the objects. This makes it possible for the floor-cleaning device to determine in which room it is located. Moreover, maps of the rooms may be generated automatically by the floor-cleaning device.

It is favorable if the signals of two or more sensors of the sensor unit are analyzable by the control unit to find out whether the floor-cleaning device is located in the particular room, and a negative determination is only established if the analysis of the two or more sensors gives the result that this is not the case. The signals of two or more sensors can be checked for plausibility.

Preferably, height information is storable in combination with or as a component of a map of a room. The height information may for example be a geographic height or an item of pressure information, wherein a corresponding sensor may take the form for example of a GPS sensor or a pressure sensor.

Maps of rooms may preferably be generable automatically by the floor-cleaning device and be storable in the storage unit, linked to the respective rooms.

The floor-cleaning device is for example a robotic vacuum cleaner, a robotic sweeper/vacuum cleaner, a self-propelling and self-steering sweeper or a self-propelling and self-steering scrubber/vacuum cleaner.

Figure 2:
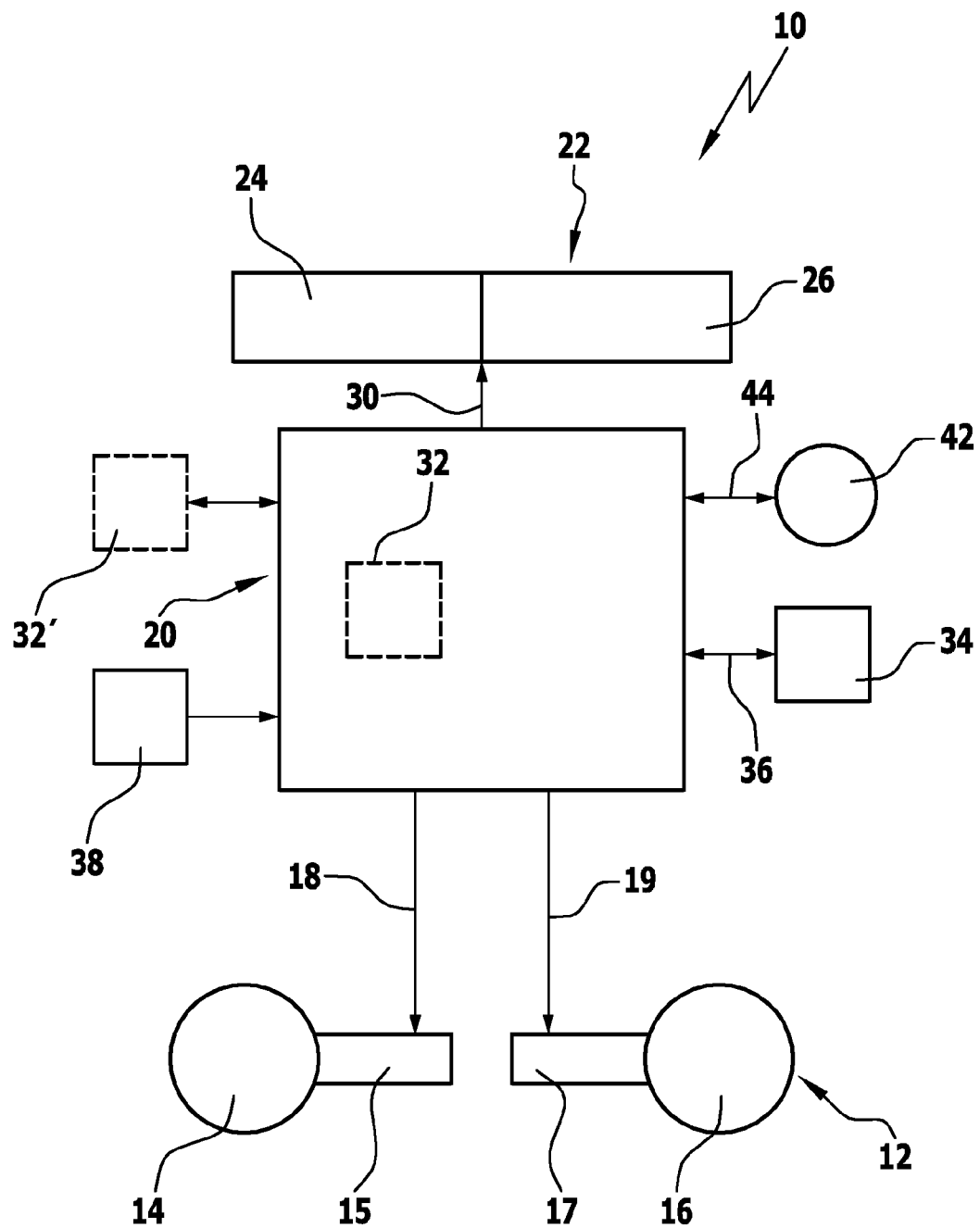
FIG. 2 shows a schematic block diagram of the floor-cleaning device from FIG. 1.

FIG. 1 shows, in a perspective illustration, an advantageous embodiment, designated by the reference numeral 10, of a floor-cleaning device in accordance with the invention whereof a block diagram is illustrated schematically in FIG. 2. In the present case, the floor-cleaning device 10 takes the form of a self-propelling and self-steering floor-cleaning device, a so-called robotic cleaner. The floor-cleaning device 10 can be used to clean floor surfaces autonomously.

For moving on floor surfaces, the floor-cleaning device 10 includes a travelling gear 12 which here has two drive wheels 14, 16. Associated with the drive wheels 14, 16 are drive motors 15 and 17 respectively, which may be controlled, over control lines 18 and 19 respectively, by a control unit 20 of the floor-cleaning device 10. The control unit 20 can control the travelling gear 12 to move the floor-cleaning device 10 at random or in accordance with a predeterminable cleaning route or cleaning pattern.

Further, the floor-cleaning device 10 has a cleaning unit 22. The cleaning unit 22 includes in particular a drivable cleaning brush 24. The latter is drivable for example to rotate about an axis of rotation that is oriented transversely to the longitudinal direction of the floor-cleaning device 10. By means of the cleaning brush, dirt can be removed from the floor surface to be cleaned.

Moreover, the cleaning unit 22 includes a suction arrangement 26. Dirt can be removed from the floor surface by suction, under the suction action of the suction arrangement 26, and removed to a dirt collection container 28. Accordingly, the floor-cleaning device 10 is a robotic sweeper/vacuum cleaner.

The cleaning unit 24 is controllable by the control unit 20 over a control line 30. For example, the cleaning brush 24 and/or the suction arrangement 26 may be activated or deactivated. The speed of rotation of the cleaning brush 24 and/or the power of the suction arrangement 26 may be altered.

Further, the floor-cleaning device 10 has a storage unit 32 that is coupled to the control unit 20. In the present case the storage unit 32, which is included by the term coupling, is integrated in the control unit 20. However, the storage unit 32 could also be formed separately from the control unit 20 and be coupled thereto over a bidirectional line (shown as storage unit 32' in FIG. 2).

In the storage unit 32 there may be stored maps of rooms that may be cleaned by the floor-cleaning device 10. The maps include features of the rooms and/or objects that may be arranged in the rooms. Using the features of the rooms or the features of the objects, the floor-cleaning device 10 can determine in which room it is located. This will be further discussed below.

Further, at least one cleaning plan may be stored in the storage unit 32. A cleaning plan, for example a weekly cleaning routine, may have a cleaning task or a plurality of cleaning tasks. The cleaning task or tasks is/are associated with a particular room. Each cleaning task may include at least one task for the floor-cleaning device 10 to clean the room associated with the cleaning task in a predetermined manner. It is possible for more than just one cleaning task to be associated with a room.

Depending on the cleaning task, the control unit 20 may control the travelling gear 12 and/or the cleaning unit 22 to perform the cleaning task. For example, it may be provided to pass over the room in accordance with a predetermined cleaning route or cleaning pattern and in so doing to clean it. It may be provided to clean particular regions of the room more intensively than other regions. Particular regions of the room may be omitted from cleaning. Depending on the nature of a floor surface, the room may be cleaned in different ways. The room may be cleaned in a random manner, in a partly planned manner or in an entirely planned manner. Depending on the cleaning task, the room or regions thereof may be cleaned in different ways as regards use of the cleaning unit 22. For example, particular parts of the room are only swept, only vacuum cleaned or both vacuum cleaned and swept.

The floor-cleaning device 10 further includes a communication unit 34 that is coupled to the control unit 20 over a bidirectional control and signal line 36. A user can give operating instructions to the floor-cleaning device 10 by way of the communication unit 34. The user can prepare maps of rooms for the floor-cleaning device 10. The user can generate cleaning plans and define cleaning tasks. The cleaning tasks can be associated with rooms.

The communication unit 34 allows the user to make a wireless and/or contact-making communication with the floor-cleaning device 10. For example, the communication unit 34 has an interface with a radio communications connection over a telecommunications network or the Internet (for example by WLAN). The communication unit 34 can have an input unit 38, which is arranged for example on a housing of the floor-cleaning device 10. The input unit 38 can include operating elements.

The floor-cleaning device 10 can send communications to the user by way of the communication unit 34, in that the latter is controlled appropriately by the control unit 20. Communications are sent to the user for example over a telecommunications connection and/or the Internet.

Further, the floor-cleaning device 10 includes a sensor unit 42. The sensor unit 42 is coupled to the control unit 20 over a bidirectional control and signal line 44. Signals of at least one sensor can be transmitted over the control and signal line 44 to the control unit 20, which can in turn trigger the sensor unit 42.

In the present case, the sensor unit 42 includes at least one and preferably a multiplicity of sensors, in particular a height sensor for determining a height information. The height sensor is for example a GPS sensor or a pressure sensor. Further, the sensor unit 42 includes for example a position sensor, in particular a GPS sensor, or a compass sensor. Further, an optical sensor 46 may be provided. The optical sensor includes for example a laser scanner and/or a camera, in particular a digital camera. Consequently, in the present case the term "sensor" also encompasses the case in which a signal is emitted by the floor-cleaning device 10 and a reflected signal, based thereon, or response signal is detected again by the corresponding sensor. For example, the optical sensor 46 may be used to scan an environment around the floor-cleaning device 10.

Further, the sensor unit 42 may have an acoustic sensor, for example an ultrasound sensor, which can have an ultrasound receiver and/or emitter.

Further, the sensor unit 42 includes for example an electromagnetic sensor for transmitting and/or receiving electromagnetic radiation such as, in particular, RFID signals.

Further, a touch sensor 48, for example a housing part in the form of a bumper 50 on the floor-cleaning device 10, may be a component of the sensor unit 42.

Signals of the sensor unit 42 may be analyzed and evaluated by the control unit 20.

Figure 3:
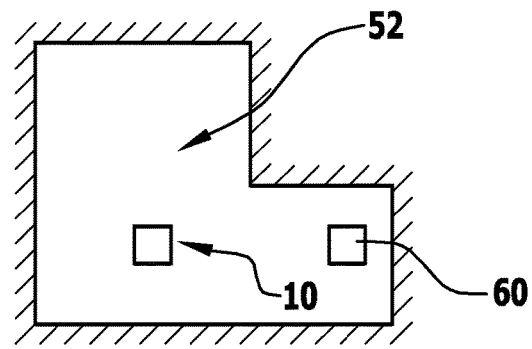
FIG. 3 shows a schematic illustration of three rooms to be cleaned, whereof associated maps are stored in a storage unit of the floor-cleaning device from FIG. 1.
Figure 3:
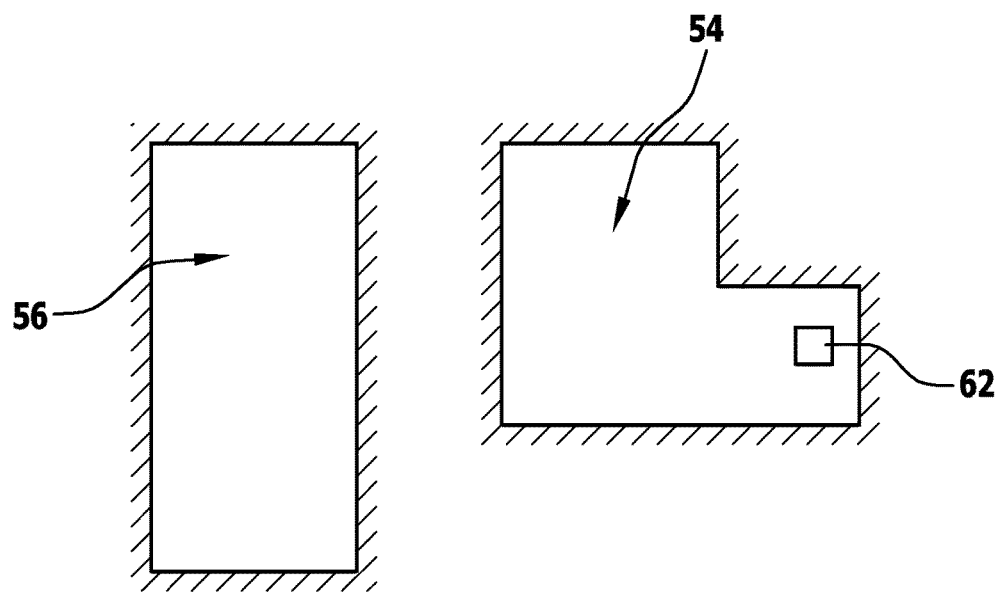

FIG. 3 shows by way of example three rooms 52, 54, 56 for which maps are stored in the storage unit 32 within the floor-cleaning device 10. FIG. 3 may thus also be regarded as an illustration of three maps that are associated with the rooms 52, 54, 56. The maps of the rooms 52, 54, 56 may be generated by the floor-cleaning device 10 itself or be prepared for it by the user. When the maps are generated, features of the rooms 52, 54, 56 or objects contained therein may be detected, using the sensor unit 42, and the relevant signals may be evaluated by the control unit 20 in order to generate the map to include objects contained therein.

Features of the rooms 52, 54, 56 that may be used to generate the map are for example walls of the room, edges, corners, thresholds, ceilings, doors, windows, the nature of the floor, curtains, radiators, luminaires and lamps, articles of furniture, marks such as marker posts, cones or cubes, power sockets or the like. In particular, the position of the room, in particular its geographical longitude and/or latitude and/or height, may also be used to identify a room 52, 54, 56. A height information may in particular also be an item of pressure information that is stored together with the map of the respective room 52, 54, 56.

Conversely, features in the maps of the rooms 52, 54, 56 may be used by the floor-cleaning device 10 to determine in which room 52, 54, 56 the floor-cleaning device is located. In particular, it is also possible for the floor-cleaning device 10 to determine whether a map in the storage unit 32 is associated with the room in which it is located. For this purpose, the floor-cleaning device 10 can undertake an investigation of the corresponding room, by way of the sensor unit 42, and signals from the sensors of the sensor unit 42 can be analyzed by the control unit 20 for features that are checked for their presence in the maps stored in the storage unit 32.

In an advantageous exemplary embodiment of the method in accordance with the invention, it is possible for the user to predetermine a cleaning plan having at least one cleaning task for the floor-cleaning device 10. For example, the cleaning plan has the cleaning task for the floor-cleaning device 10 of cleaning the room 52. If the floor-cleaning device 10 is placed in the room 52, the floor-cleaning device 10 can determine, on the basis of the features of the room 52 known to it and stored in the corresponding map, that it is located in the room 52. The cleaning task can be performed by the floor-cleaning device 10 and the cleaning plan can be executed.

In the present example, the cleaning plan contains the cleaning task of first cleaning the room 54 and then contains a cleaning task for the room 52. There is no cleaning task for the room 56, for example.

Figure 4:
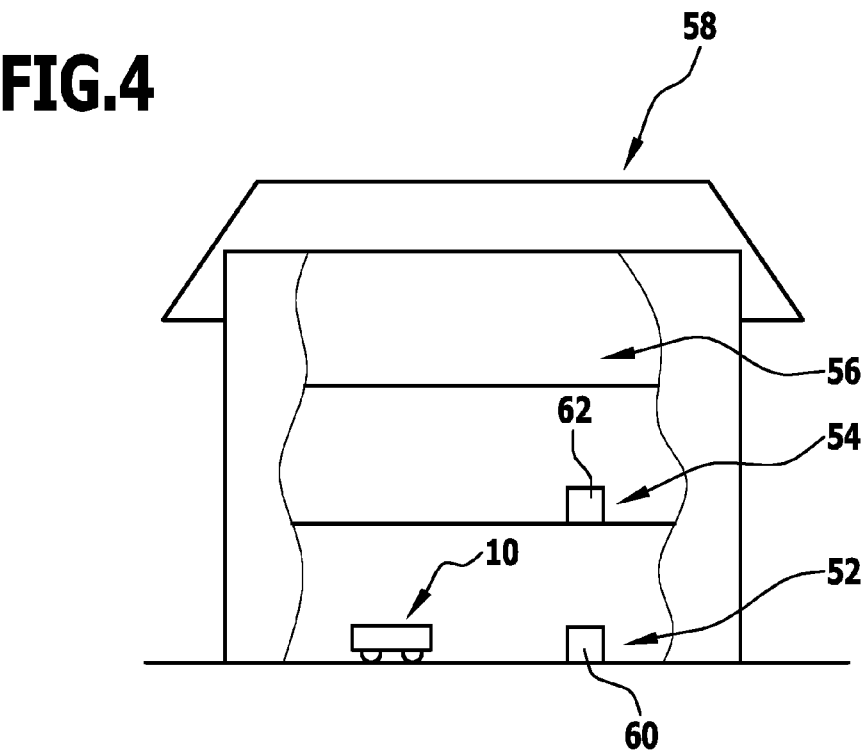
FIG. 4 shows a schematic illustration of a building with multiple floors, in which the floor-cleaning device from FIG. 1 can clean different rooms.

The user positions the floor-cleaning device 10 in the room 52, which is, however, separated from the room 54 by physical limits. For example, the rooms 52, 54 and 56 are on different floors of a building 58 (FIG. 4). It is not possible for the self-propelling and self-steering floor-cleaning device 10 to move from the room 52 to the room 54.

In an advantageous exemplary embodiment of the method in accordance with the invention, the floor-cleaning device determines in which room it is located. Using the features stored in the map, the floor-cleaning device 10 can determine that it is in the room 52. However, the cleaning plan provides for performing the cleaning task for the room 54 first. Accordingly, determining that the floor-cleaning device 10 is located in the room 54 gives a negative result.

In accordance with the invention, performance of the cleaning task that is associated with the room 54 by the floor-cleaning device 10 is not carried out, is interrupted or is ended. Particularly preferably, before the start of the cleaning task, the floor-cleaning device 10 determines whether it is located in the room 54. The result of the determination, negative in the present case, causes the floor-cleaning device 10 not to perform the cleaning task associated with this room 54, that is to say it is not carried out. Since the rooms 52 and 54 are located on different floors in the building 58, the floor-cleaning device 10 cannot moreover move to the room 54 in order to perform the cleaning task.

In the present case, the floor-cleaning device 10 may automatically make a change to the cleaning plan predetermined by the user. Particularly preferably, the floor-cleaning device 10 can determine that it is located in the room 52, with which the user has likewise associated a cleaning task. The floor-cleaning device 10 can defer the cleaning task associated with the room 54 within the cleaning plan, and perform the cleaning task associated with the room 52 first. This makes it possible to execute the cleaning plan particularly efficiently.

In addition or as an alternative, the floor-cleaning device 10 can send a communication of the negative determination to the user, by way of the communication unit 34. By way of the communication unit 34, the user can change or delete the cleaning plan in the floor-cleaning device 10. As an alternative, it is possible for the user to transport the floor-cleaning device 10 from the room 52 to the room 54 in order to perform the cleaning task associated with this room 54 first.

It may also be provided for the cleaning plan to be changed by the floor-cleaning device 10 automatically in that the cleaning task associated with the room 54 is deleted from the cleaning plan. The subsequent cleaning task in the cleaning plan is associated with the room 52, so this cleaning task can be performed first.

In a further advantageous exemplary embodiment of the method in accordance with the invention, it may be provided that the cleaning plan has a cleaning task for the room 54 but not for the room 52, and that the floor-cleaning device 10 is located in the room 52. In this case, the floor-cleaning device 10 may also perform cleaning of the room 52 in the absence of a cleaning task. For example, a basic cleaning routine may be stored in the storage unit 32 and may be performed as standard by the floor-cleaning device 10 if there is no specific cleaning task. In the basic cleaning routine, the floor-cleaning device 10 may for example move until it collides with something, in a partly planned manner or in an entirely planned manner, using both the cleaning brush 24 and the suction arrangement 26.

If the floor-cleaning device 10 is located in a room with which no map is associated in the storage unit 32, before a cleaning task is performed the floor-cleaning device 10 may likewise determine that it is not located in a room associated with the cleaning task. In this case too, the floor-cleaning device 10 can perform a basic cleaning routine. In this context, the floor-cleaning device 10 can simultaneously generate a map of this room and store it in the storage unit 32.

It is emphasized that the advantageous exemplary embodiments of the method in accordance with the invention that are explained above do not require that three rooms 52, 54, 56 are present, that the rooms 52, 54, 56 are located in the same building 58 and are on different floors thereof and/or that the cleaning plan has only one or two cleaning tasks. For example, rooms to be cleaned may be located on the same story of a building 58 or in different buildings. A cleaning task may be associated with each room, and there may be fewer or more than three rooms.

It has been found advantageous for the floor-cleaning device 10, which may have a height sensor, also to be able to distinguish between rooms 52, 54, 56 that are located on different floors of the building 58. This is possible—see for example the rooms 52 and 54—even if the rooms have the same footprint and, other than the height information, the rooms 52, 54 have identical features which are also stored in the maps associated therewith. Using the height information stored in the map of the rooms 52, 54, the floor-cleaning device 10 can identify the floor on which it is arranged, and by means of this identification can conclude which is the corresponding room 52, 54.

Figure 5:
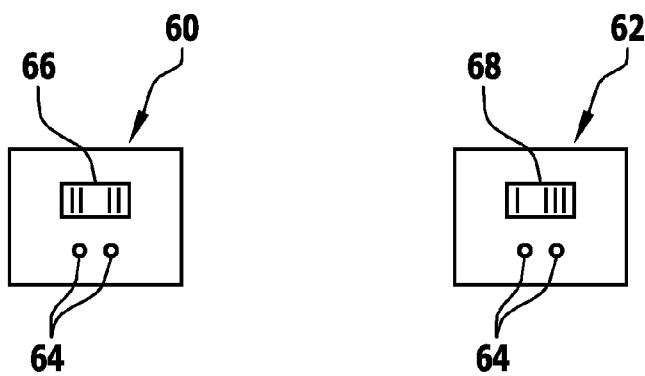
FIG. 5 shows a schematic illustration of two charging and/or emptying stations for the floor-cleaning device from FIG. 1, with marks.

FIGS. 3, 4 and 5 show schematically stations 60 and 62 for charging and/or emptying the floor-cleaning device 10. The station 60 is arranged in the room 52 and the station 62 in the room 54.

The floor-cleaning device 10 can make contact with electrical contact elements 64 of the respective station 60, 62 so that a battery of the floor-cleaning device 10 can be charged. The dirt collection container 28 can be emptied by way of a discharge point (not shown in the drawing).

The stations 60, 62 include marks 66 and 68 respectively which are different from one another. The floor-cleaning device 10 can determine which station 60 or 62 it is by way of this difference. Accordingly, the floor-cleaning device 10 can use the result of this determination to find an association with the room 52 or 54 and determine in which of these rooms 52, 54 it is located.

The marks 66, 68 are for example reflecting elements, which reflect signals that are emitted by the sensor unit 42 and can be received again by the sensor unit 42. The mark 66, 68 can also be an RFID label or another form of mark by means of which the stations 60, 62 can be distinguished.

It may be provided for the user to position the floor-cleaning device 10 in front of a station 60 or 62 before the start of execution of a cleaning plan so that this station is identified by the floor-cleaning device 10 and an association with the room 52, 54 can be found in a simple manner.

Instead of the stations 60, 62, as already mentioned it is also possible to use other kinds of marker elements for labeling a room 52, 54, 56, such as marker posts, cones or cubes.

Other forms of labeling of rooms 52, 54, 56 may for example be carried out by way of matrix codes (for example QR codes), bar codes or RFID tags that are arranged in the rooms 52, 54 or 56.

The invention claimed is:

1. A method for operating a self-propelling and self-steering floor-cleaning device, wherein at least one map of at least one room to be cleaned is stored in a storage unit of the floor-cleaning device, as is a user-predeterminable cleaning plan having one or more cleaning tasks, wherein at least one cleaning task is associated with a particular room that is identifiable from the at least one map, and the floor-cleaning device is placed in a room, the method comprising:
when the cleaning plan is executed, analyzing, with a control unit of the floor-cleaning device, at least one sensor signal of a sensor unit of the floor-cleaning device for features indicative of the room the floor-cleaning device is in;
checking for presence of the features in the at least one map stored in the storage unit; and
determining whether the room in which the floor-cleaning device is placed is the particular room;
wherein, if the result of this determination is negative, performance of the cleaning task associated with the particular room is not carried out, is interrupted or is ended.

2. The method in accordance with claim 1, wherein the floor-cleaning device determines, before the start of performing the cleaning task, whether the floor-cleaning device is located in the particular room.

3. The method in accordance with claim 1, wherein, if the result of determination is negative, the floor-cleaning device sends a communication thereof to the user.

4. The method in accordance with claim 1, wherein the floor-cleaning device makes a change to the cleaning plan if the result of the determination is negative.

5. The method in accordance with claim 4, wherein the cleaning task is deleted from the cleaning plan, or is deferred in a sequence of cleaning tasks in the cleaning plan.

6. The method in accordance with claim 1, wherein the floor-cleaning device determines whether a map of the room in which it is positioned is stored in the storage unit, and whether the cleaning plan has a cleaning task associated with this room, and wherein if so this cleaning task is performed.

7. The method in accordance with claim 6, wherein the method is performed if the rooms are physically separated from one another and there are physical limits in the maps associated with the rooms.

8. The method in accordance with claim 1, wherein, if the result of determination is negative, cleaning of the room in which the floor-cleaning device is located is performed, regardless of whether the cleaning plan has a cleaning task associated with this room.

9. The method in accordance with claim 1, wherein, in order to determine in which room the floor-cleaning device is located, at least one of a position of the room in at least one spatial dimension, an orientation of the room, features of boundaries of the room, features of a floor surface of the room, features of objects arranged or included in the room, features of a charging station that is arranged in the room for the floor-cleaning device and features of an emptying station that is arranged in the room for the floor-cleaning device are taken into consideration.

10. The method in accordance with claim 9, wherein objects that are arranged in the room are identified by reference to at least one mark or labeling that is detected by the floor-cleaning device.

11. The method in accordance with claim 1, wherein, to determine in which room the floor-cleaning device is located, at least one of a height sensor, a position sensor, a compass sensor, an optical sensor, a magnetic field sensor, an acoustic sensor, an electromagnetic sensor and a touch sensor is used by the floor-cleaning device.

12. The method in accordance with claim 1, wherein the signals of two or more sensors are analyzed to find out whether the floor-cleaning device is located in the particular room, and a negative determination is only established if the analysis of the signals of the two or more sensors gives the result that this is not the case.

13. The method in accordance with claim 1, wherein height information is stored in combination with or as a component of a map of a room.

14. The method in accordance with claim 1, wherein maps of rooms are created by the floor-cleaning device and are stored in the storage unit, the maps being linked to the respective rooms.

15. A self-propelling and self-steering floor-cleaning device comprising:
 a travelling gear configured to move the floor-cleaning device on a floor surface;
 a cleaning unit configured to clean the floor surface;
 a control unit coupled to the travelling gear and the cleaning unit;
 a storage unit that is coupled to the control unit, at least one map of at least one room to be cleaned as well as a user-predeterminable cleaning plan having one or more cleaning tasks stored in the storage unit, at least one cleaning task being associated with a particular room that is identifiable from a map; and
 a sensor unit that is coupled to the control unit;
 wherein, when the cleaning plan is executed, the control unit:
  is configured to analyze at least one sensor signal of the sensor unit for features indicative of the room the floor-cleaning device is in;
  is configured to check for presence of the features in the at least one map stored in the storage unit; and
  is configured to determine whether the room in which the floor-cleaning device is placed is the particular room; and
 wherein, if the result of this determination is negative, the control unit is configured to not carry out, interrupt or end performance of the cleaning task associated with the particular room.

16. The floor-cleaning device in accordance with claim 15, wherein, before the start of performance of the cleaning task, it is determined whether the floor-cleaning device is located in the particular room.

17. The floor-cleaning device in accordance with claim 15, wherein the floor-cleaning device includes a communication unit that is coupled to the control unit, and wherein, if the result of determination is negative, a communication thereof is transmissible to a user.

18. The floor-cleaning device in accordance with claim 15, wherein, if the result of determination is negative, a change in the cleaning plan is made by the control unit.

19. The floor-cleaning device in accordance with claim 18, wherein the cleaning task is deleted from the cleaning plan or is deferred in a sequence of cleaning tasks in the cleaning plan.

20. The floor-cleaning device in accordance with claim 15, wherein it is determinable by the control unit whether a map of the room in which the floor-cleaning device is positioned is stored in the storage unit, and whether the cleaning plan has a cleaning task associated with this room, and wherein if so this cleaning task is performed by the floor-cleaning device.

21. The floor-cleaning device in accordance with claim 20, wherein the cleaning task is performed if the rooms are physically separated from one another and there are physical limits in the maps associated with the rooms.

22. The floor-cleaning device in accordance with claim 15, wherein, if the result of determination is negative, cleaning of the room in which the floor-cleaning device is located is performable by the floor-cleaning device regardless of whether the cleaning plan has a cleaning task associated with this room.

23. The floor-cleaning device in accordance with claim 15, wherein, in order to determine in which room the floor-cleaning device is located, at least one of a position of the room in at least one spatial dimension, an orientation of the room, features of boundaries of the room, features of a floor surface of the room, features of objects arranged or included in the room, features of a charging station that is arranged in the room for the floor-cleaning device and features of an emptying station that is arranged in the room for the floor-cleaning device are taken into consideration.

24. The floor-cleaning device in accordance with claim 23, wherein objects that are arranged in the room are identified by reference to at least one mark or labeling that is detectable by the floor-cleaning device by means of the sensor unit.

25. The floor-cleaning device in accordance with claim 15, wherein the sensor unit includes at least one of a height sensor, a position sensor, a compass sensor, an optical sensor, an acoustic sensor, a magnetic field sensor, an electromagnetic sensor and a touch sensor.

26. The floor-cleaning device in accordance with claim 15, wherein the signals of two or more sensors of the sensor unit are analyzable by the control unit to find out whether the floor-cleaning device is located in the particular room, and a negative determination is only established if the analysis of the signals of the two or more sensors gives the result that this is not the case.

27. The floor-cleaning device in accordance with claim 15, wherein height information is storable in combination with or as a component of a map of a room.

28. The floor-cleaning device in accordance with claim 15, wherein maps of rooms are generable by the floor-cleaning device and are storable in the storage unit, the maps being linked to the respective rooms.

\* \* \* \* \*